US009792267B2

(12) United States Patent
Tupil et al.

(10) Patent No.: US 9,792,267 B2
(45) Date of Patent: Oct. 17, 2017

(54) SIMPLIFYING IDENTIFICATION OF POTENTIAL NON-VISIBILITY OF USER INTERFACE COMPONENTS WHEN RESPONSIVE WEB PAGES ARE RENDERED BY DISPARATE DEVICES

(71) Applicant: NIIT Technologies Ltd, New Delhi (IN)

(72) Inventors: Radha Tupil, Bangalore (IN); Udayan Banerjee, Bangalore (IN); Vikram Nagaraja Rao, Bangalore (IN); Kanakalata Narayanan, Bangalore (IN); Deepesh P C, Bangalore (IN)

(73) Assignee: NIIT Technologies Ltd, New Delhi (IN)

( * ) Notice: Subject to any disclaimer, the term of this patent is extended or adjusted under 35 U.S.C. 154(b) by 359 days.

(21) Appl. No.: 14/625,651

(22) Filed: Feb. 19, 2015

(65) Prior Publication Data

US 2015/0278172 A1    Oct. 1, 2015

(30) Foreign Application Priority Data

Mar. 31, 2014 (IN) .......................... 1719/CHE/2014

(51) Int. Cl.
*G06F 3/0481* (2013.01)
*G06F 17/22* (2006.01)
(Continued)

(52) U.S. Cl.
CPC ........ *G06F 17/2247* (2013.01); *G06F 17/212* (2013.01); *G06F 17/30861* (2013.01); *H04L 67/02* (2013.01); *H04L 67/10* (2013.01)

(58) Field of Classification Search
CPC ......... G06F 17/30899; G06F 17/30905; G06F 3/14; G06F 17/2247; G06F 17/212;
(Continued)

(56) References Cited

U.S. PATENT DOCUMENTS 5,572,647 A * 11/1996 Blades .................. G06F 3/0481
715/798
7,444,548 B2    10/2008 Shane
(Continued)

OTHER PUBLICATIONS

A free tool for designers to quickly test responsive websites, waybackmachine, http://www.dimensionsapp.com/, downloaded circa Aug. 7, 2013, pp. 1-2.
(Continued)

*Primary Examiner* — Tadeese Hailu
(74) *Attorney, Agent, or Firm* — Iphorizons PLLC; Narendra Reddy Thappeta

(57) ABSTRACT

Aspects of the present disclosure simplify identification of potential non-visibility of user interface (UI) components when a responsive web page is rendered by disparate devices. In one embodiment, a browser is instructed to display the web page in a viewport of a desired size. Upon the browser rendering the web page in the viewport, a data structure (e.g., DOM) generated by the browser is examined to determine whether each of the components of the responsive web page is visible or non-visible within the viewport, and a corresponding visibility report is generated. The steps of instructing and examining may be performed iteratively for a number of viewports of corresponding sizes. The visibility report is then generated as a two-dimensional matrix indicating whether each component (along a first dimension) is visible or non-visible when the web page is rendered in a corresponding viewport (along a second dimension).

18 Claims, 12 Drawing Sheets

(51) Int. Cl.
 H04L 29/08 (2006.01)
 G06F 17/21 (2006.01)
 G06F 17/30 (2006.01)
(58) Field of Classification Search
 CPC ............ G06F 17/30861; G06F 3/0484; G06F 3/0485; G06F 3/0482; G09G 5/14; G09G 5/34
 See application file for complete search history.

(56) References Cited

U.S. PATENT DOCUMENTS

| | | | | |
|---|---|---|---|---|
| 7,444,599 B1* | 10/2008 | Chaudhri | ............ | G06F 3/0485 715/815 |
| 7,757,175 B2 | 7/2010 | Miller | | |
| 8,356,258 B2* | 1/2013 | Matthews | ............ | G06F 3/0481 345/684 |
| 9,135,233 B2* | 9/2015 | Fan | ............ | G06F 17/30554 |
| 2005/0195221 A1* | 9/2005 | Berger | ............ | G06F 3/0481 345/660 |
| 2005/0216858 A1* | 9/2005 | Fabritius | ............ | G06F 3/0481 715/802 |
| 2006/0217930 A1 | 9/2006 | Chang et al. | | |
| 2009/0262142 A1* | 10/2009 | Ferlitsch | ............ | G06F 3/0481 345/661 |
| 2010/0325533 A1* | 12/2010 | Artz | ............ | G06F 17/30905 715/235 |
| 2011/0029393 A1* | 2/2011 | Apprendi | ............ | G06Q 30/0277 705/14.73 |
| 2011/0063310 A1* | 3/2011 | Iwade | ............ | G09G 5/363 345/522 |
| 2011/0137733 A1* | 6/2011 | Baird | ............ | G06Q 30/0272 705/14.68 |
| 2012/0017147 A1* | 1/2012 | Mark | ............ | G06F 1/1639 715/702 |
| 2012/0210209 A1 | 8/2012 | Biddle | | |
| 2012/0256949 A1* | 10/2012 | Treat | ............ | G06F 9/4443 345/629 |
| 2013/0067315 A1* | 3/2013 | Rakow | ............ | G06F 3/04886 715/234 |
| 2013/0111330 A1* | 5/2013 | Staikos | ............ | G06F 17/21 715/241 |
| 2013/0185164 A1* | 7/2013 | Pottjegort | ............ | G06Q 30/02 705/14.73 |
| 2013/0304906 A1* | 11/2013 | Yavilevich | ............ | H04L 67/22 709/224 |
| 2014/0006982 A1* | 1/2014 | Wabyick | ............ | G06F 17/212 715/763 |
| 2014/0040776 A1* | 2/2014 | Dann | ............ | G06F 3/0485 715/753 |
| 2014/0108915 A1* | 4/2014 | Lu | ............ | G06F 17/2247 715/234 |
| 2014/0189487 A1* | 7/2014 | Kwan | ............ | G06F 17/30899 715/234 |
| 2014/0313209 A1* | 10/2014 | Hu | ............ | G06F 17/30899 345/503 |
| 2014/0344663 A1* | 11/2014 | Joel | ............ | G06F 17/2264 715/234 |
| 2015/0095768 A1* | 4/2015 | Rimmer | ............ | G06F 17/211 715/238 |
| 2015/0254732 A1* | 9/2015 | Snyder | ............ | G06Q 30/0277 705/14.72 |
| 2015/0269126 A1* | 9/2015 | Hepper | ............ | G06F 17/2235 715/238 |
| 2016/0041723 A1* | 2/2016 | Ren | ............ | G06F 3/04842 715/765 |
| 2016/0062584 A1* | 3/2016 | Cohen | ............ | G06F 3/0485 715/784 |

OTHER PUBLICATIONS

Energise web, http://www.energise.co.nz/responsive-web-design-test/, downloaded circa Nov. 28, 2013, pp. 1-4.
Firefox browser tool to test Responsive Web design, http://roopeshreddy.wordpress.com/2013/05/26/firefox-browser-tool-to-test-responsive-web-design/, downloaded circa Apr. 1, 2015, pp. 1-5.
How to test responsive designs for free, http://www.webdesignerdepot.com/2013/07/how-to-test-responsive-designs-for-free/, downloaded circa Apr. 1, 2015, pp. 1-8.
How responsive is your website?, http://www.responsivedesignchecker.com/, downloaded circa Nov. 28, 2015, pp. 1-3.
Responsive test, http://responsivetest.net/#u=http://www.magentothemes.net|320|480|1, downloaded circa Nov. 28, 2015, pp. 1-3.
Responsive Web Design: Real User Testing, http://www.sitepoint.com/responsive-web-design-real-user-testing/, downloaded circa May 7, 2015 pp. 1-10.
Techniques for mobile and responsive cross-browser testing, http://webuild.envato.com/blog/techniques-for-mobile-and-responsive-cross-browser-testing/, downloaded circa Nov. 28, 2013, pp. 1-9.
Test Your Responsive Web Design With the Responsinator, http://markchouanard.com/post/24579590866/test-your-responsive-web-design-with-the-responsinator, downloaded circa Nov. 27, 2013, pp. 1-2.

* cited by examiner

```
<!DOCTYPE html>
<html>
  <head>
    <meta charset="utf-8">
    <meta name="viewport" content="width=device-width, initial-scale=1">
    <link rel="stylesheet" href="http://maxcdn.bootstrapcdn.com/bootstrap/3.2.0/css/bootstrap.min.css">
  </head>
  <body>
    <div id="P" class="container">
      <div class="row">
        <div id="A1" class="col-md-6">... </div>
        <div id="A2" class="col-md-6">... </div>
      </div>
    </div>
    <div id="Q" class="container">
      <div id="B" class="jumbotron"> ... </div>
    </div>
    <div id="R" class="container">
      <div class="row-fluid">
        <div id="C1" class="col-md-3">... </div>
        <div id="C2" class="col-md-3">... </div>
        <div id="C3" class="col-md-3">... </div>
        <div id="C4" class="col-md-3">... </div>
      </div>
    </div>
    <div id="S" class="container-fluid">
      <div class="row-fluid">
        <div id="D1" class="col-md-4">... </div>
        <div id="D2" class="col-md-4">... </div>
        <div id="D3" class="col-md-4">... </div>
      </div>
    </div>
  </body>
</html>
```

Non Conformance Report

Reference view port: 720 x 540, Browser, Landscape

View port #3: 320 x 480, M-Browser, Portrait
* C3 Not Visible
* C4 Not Visible
* D2 Not Visible

*FIG. 5*

| 400 | 410<br>1024 x 768<br>Browser<br>Landscape | 420<br>720 x 540<br>Browser<br>Landscape | 430<br>320 x 480<br>Browser<br>Portrait |
|---|---|---|---|
| A1 | Yes | Yes | Yes |
| A2 | Yes | Yes | Yes |
| B | Yes | Yes | Yes |
| C1 | Yes | Yes | Yes |
| C2 | Yes | Yes | Yes |
| C3 | Yes | Yes | NO |
| C4 | Yes | Yes | NO |
| D1 | Yes | NO | NO |
| D2 | Yes | Yes | NO |
| D3 | Yes | NO | NO |

*FIG. 4*

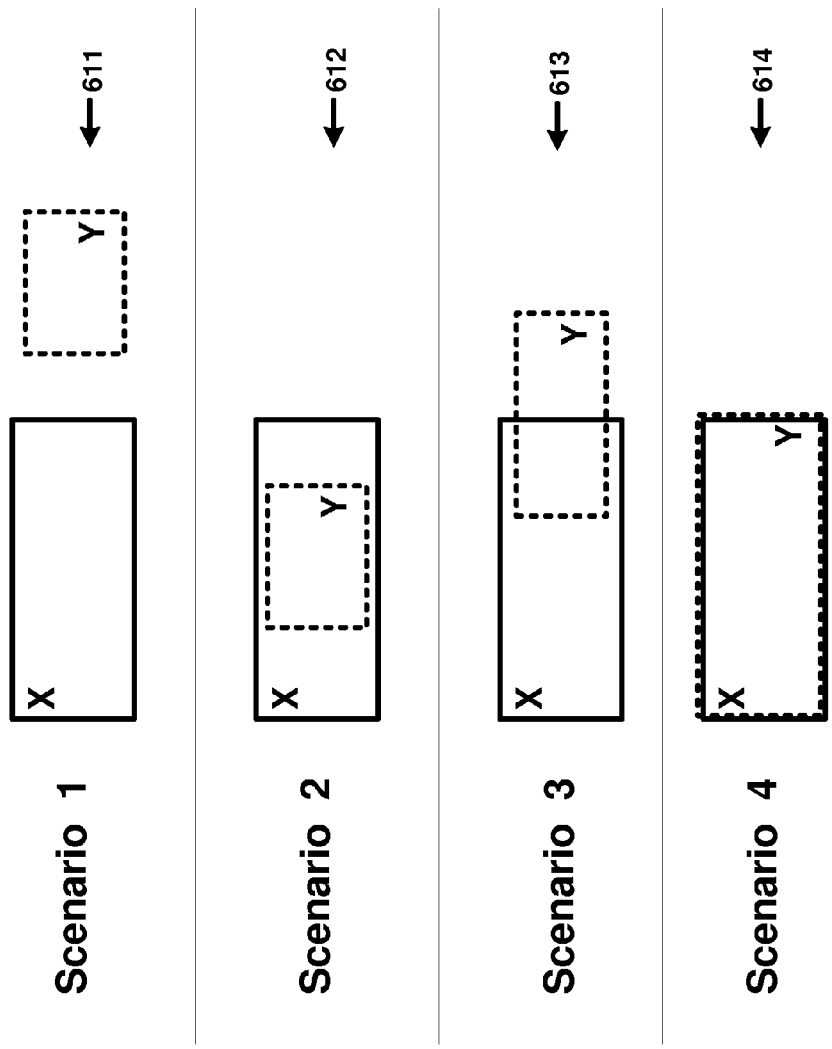

SIMPLIFYING IDENTIFICATION OF POTENTIAL NON-VISIBILITY OF USER INTERFACE COMPONENTS WHEN RESPONSIVE WEB PAGES ARE RENDERED BY DISPARATE DEVICES

PRIORITY CLAIM

The instant patent application is related to and claims priority from the co-pending provisional India patent application entitled, "Simplifying Identification Of Potential Non-Visibility Of User Interface Components When Responsive Web Pages Are Rendered By Disparate Devices", Serial No.: 1719/CHE/2014, Filed: 31 Mar. 2014, which is incorporated in its entirety herewith to the extent not inconsistent with the disclosure herein.

BACKGROUND OF THE DISCLOSURE

Technical Field

The present disclosure relates to software systems and more specifically to simplifying identification of potential non-visibility of user interface components when responsive web pages are rendered by disparate devices.

Related Art

A web page may be viewed as containing the interface definitions of one or more user interface (UI) components. When the web page is rendered by a browser to provide a user interface on a display screen, each UI component controls the input/output characteristics in a corresponding display portion of the user interface.

Responsive web pages are a type of web pages, which can be easily appreciated in contrast with traditional web pages. In traditional web pages, the size (width by height), location, etc., of each UI component is specified in absolute measures, and browsers formulate the eventual layout while complying with the constraints of such absolute measures. Such traditional web pages are generally unsuitable for rendering on disparate devices that come with corresponding display sizes (e.g., a small screen of a mobile phone contrasted with large screen of a workstation).

On the other hand, in responsive web pages, the definitions are more flexible in that sizes, locations, etc., of UI components are specified relative to other UI components. Accordingly, browsers have the flexibility to formulate the layout (the actual size, location, etc.) based on the display size available and the relative characteristics specified in the definitions. As a result, responsive web pages may generally provide better visual characteristics across a range of disparate devices, though having different display sizes.

In view of browsers determining the layout of a responsive web page, some of the UI components defined in the web page may be visible when rendered on some devices, while not being visible when rendered on some other devices. There is accordingly a general need to identify such potential non-visibility of UI components when responsive web pages would be rendered on disparate devices.

BRIEF DESCRIPTION OF THE DRAWINGS

Example embodiments of the present disclosure will be described with reference to the accompanying drawings briefly described below.

FIG. 3E depicts a portion of a responsive web page in one embodiment.

FIG. 4 depicts portions of a visibility report generated for a responsive web page viewed in multiple viewports in one embodiment.

FIG. 5 depicts portions of a non-conformance report created with respect to a reference viewport in one embodiment.

FIG. 6A illustrates various overlapping scenarios among two UI components of a responsive web page in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Definitions

Figure 1:
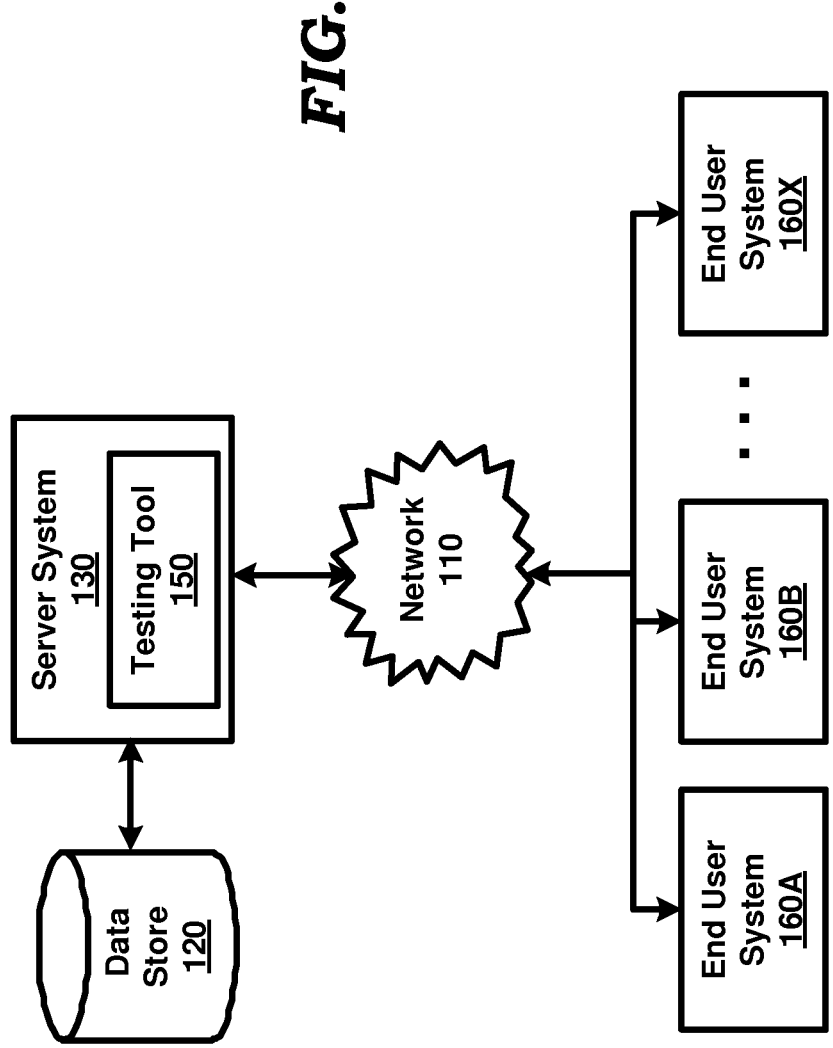
FIG. 1 is a block diagram illustrating an example environment (computing system) in which several aspects of the present disclosure can be implemented.

Rendering of a web page: Generating the display/video/audio signals corresponding to the interface definitions contained in the web page.

Viewport: The frame within a browser in which a webpage is rendered. The dimensions of viewports are different for different combinations of devices (having different physical screen sizes), display mode (portrait or landscape), browsers (Internet Explorer™, Chrome™, etc.) and browser versions (version 8.0 or 11.0 of Internet Explorer™).

UI Component: A portion of a user interface providing a corresponding interaction to the user Visible component: A UI component that a user can see in a viewport either when the web page is initially rendered or when the user scrolls the viewport vertically.

Non-visible component: A UI component that is either not visible in the viewport when the web page is rendered (in any scroll position) or requires the user to scroll the viewport horizontally to view the component.

Reference viewport: A viewport that is indicated (by a user) to be the reference point for determining non-conformance of other viewports. In particular, if any of the UI components that are visible in the reference viewport is not visible in a viewport, that viewport is marked as non-conformant.

2. Overview

An aspect of the present disclosure simplifies identification of potential non-visibility of user interface components when responsive web pages are rendered by disparate devices. In one embodiment, a browser is instructed to display a responsive web page (containing multiple UI components) in a first viewport of a first size. In response, the browser renders the responsive web page in the first viewport of the first size. A data structure (e.g., Document Object Model or DOM) generated by the browser is examined to determine whether each of the components of the responsive web page is visible or non-visible within the first viewport. A visibility report indicating which ones of the components are visible or non-visible in the first viewport is then generated.

According to another aspect of the present disclosure, the steps of instructing the browser and examining the data are performed iteratively for a number of viewports, each viewport being of a corresponding size in respective iteration. The visibility report is then generated in the form of a two-dimensional matrix, with the different viewports along a first dimension (say, as columns of the matrix), and the components along a second dimension (say, as rows of the matrix). Each cell of the two-dimensional matrix at the intersection of a specific viewport and a specific component indicates whether the specific component is visible or non-visible when the responsive web page is rendered in the specific viewport.

According to one more aspect of the present disclosure, a first input indicating a reference set of components is received, wherein each of said reference set of components is required to be visible in all the viewports. In one embodiment, the first input is a reference viewport, with the components that are visible in the reference viewport constituting the reference set of components. In response to the first input, a non-conformance report is created indicating the viewports that are non-conforming, wherein a viewport is included in the non-conformance report if at least one of the reference set of components is not visible in the viewport.

According to yet another aspect of the present disclosure, a second input indicating a desired overlapping of each component with other components of the responsive web page is received. In one embodiment, the second input is in the form of a two-dimensional matrix with the components along both the dimensions and each cell indicating a corresponding overlap scenario between the components along the two dimensions. In response to the second input, a non-conforming overlapping report indicating which one of the components are non-conforming in the first viewport with respect to the second input is created (based on examining the data structure). In particular, the non-conforming overlapping report indicates whether the overlap scenario between a pair of components in the first viewport is same as (or different from) the overlap scenario specified for the pair in the second input.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

3. Example Environment

FIG. 1 is a block diagram illustrating an example environment (computing system) in which several aspects of the present disclosure can be implemented. The block diagram is shown containing network 110, data store 120, server system 130 (in turn shown executing testing tool 150) and end user systems 160A-160X.

Merely for illustration, only representative number/type of systems is shown in FIG. 1. Many environments often contain many more systems, both in number and type, depending on the purpose for which the environment is designed. Each block of FIG. 1 is described below in further detail.

Network 110 provides connectivity between server system 130 and end user systems 160A-160X, and may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110.

Data store 120 represents a non-volatile (persistent) storage facilitating storage and retrieval of a collection of data by applications executing in server system 130 (such as testing tool 150). Data store 120 may be implemented as a database server using relational database technologies and accordingly provide storage and retrieval of data using structured queries such as SQL (Structured Query Language). Alternatively, data store 120 may be implemented as a file server providing storage and retrieval of data in the form of files organized as one or more directories, as is well known in the relevant arts.

Server system 130 represents a server, such as a web/application server, executing applications capable of performing tasks requested by users using one of end user systems 160A-160X. A server system may use data stored internally (for example, in a non-volatile storage/hard disk within the server system), external data such as in data store 120 and/or data received from external sources (e.g., from the user) in performing such tasks. The server system then sends the result of performance of the tasks to the requesting end user system (one of 160A-160X). The results may be accompanied by specific user interfaces (e.g., web pages) for displaying the results to the requesting user.

Each of end user systems 160A-160X represents a system such as a personal computer, workstation, mobile station, mobile phones, computing tablets, etc., used by users to generate requests directed to applications executing in server system 130. The requests may be generated using appropriate user interfaces (e.g., web pages provided by an application executing in a server system, a native user interface provided by a portion of the application downloaded from the server system, etc.). In general, an end user system requests an application for performing desired tasks and receives corresponding responses containing the results of performance of the requested tasks.

It may be appreciated that in several environments, end user systems 160A-160X may be heterogeneous in terms of the hardware and/or operating systems (such as Microsoft Windows XP operating system, Linux operating system, Google Android operating system, Apple IOS operating system, etc.) pre-installed in the end user systems.

In terms of hardware, the different end user systems (desktops or tablets or mobile phones) may have different physical screen sizes and accordingly different sizes of viewports in which web pages are rendered. In terms of operating systems, the different end user systems may have different browsers (of different versions) which may render the same web page in viewports of different sizes. In general, the several combinations of such requirements may necessitate responsive web pages to be tested against viewports of a large number (potentially of the order of several thousands) of different sizes.

Thus, though responsive web pages facilitate developer to support multiple different viewports, there are several challenges in the development of the responsive web pages. For example, a developer may wish to identify the potential non-visibility of UI components when a responsive web page is rendered in viewports of different sizes on disparate devices/end user systems.

Testing tool 150, provided according to several aspects of the present disclosure, simplifies a user/developer's task of identifying potential non-visibility of UI components in a responsive web page, as described below with examples.

4. Simplifying Identification of Potential Non-Visibility of UI Components

Figure 2A:
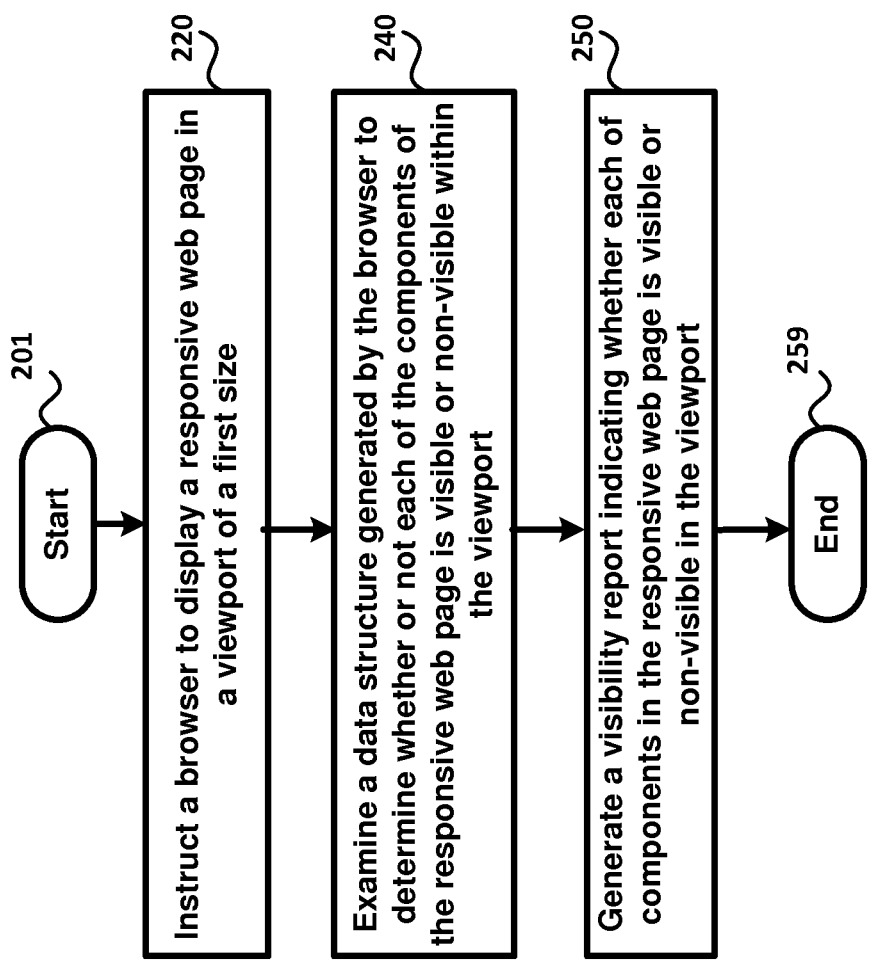
FIG. 2A is a flow chart illustrating the manner in which identification of potential non-visibility of user interface components in responsive web pages is simplified according to an aspect of the present disclosure.

FIG. 2A is a flow chart illustrating the manner in which identification of potential non-visibility of user interface components when responsive web pages are rendered by disparate devices is simplified according to an aspect of the present disclosure. The flowchart is described with respect to testing tool 150 of FIG. 1 merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 220.

In step 220, testing tool 150 instructs a browser to display a responsive web page in a viewport of a first size, wherein the browser in response renders the responsive web page in the viewport of the first size. The rendered responsive web page may be displayed on a display unit (not shown) of server system 130. The instruction may be provided in any convenient manner (for example, the browser may be initiated with a path/URL to the web page).

In step 240, testing tool 150 examines a data structure (e.g., DOM, noted above) generated by the browser (after rendering the responsive web page) to determine whether each of the components of the responsive web page is visible or non-visible within the viewport. In one embodiment, the data structure contains a visibility flag associated with each UI component indicating whether the component is visible or non-visible (assuming that any partially visible components are also deemed to be visible), and the browser populates the flags during rendering of the web page. Testing tool 150 may accordingly inspect the flag information to determine which of the components are visible or non-visible within the viewport.

In step 250, testing tool 150 generates a visibility report indicating whether each of the components of the responsive web page is visible or non-visible in the viewport. The flow chart ends in step 259.

Thus, the task of a user/developer in identifying which of the (UI) components are non-visible in the viewport is simplified. The user/developer may accordingly modify (the instructions forming) the responsive web page to ensure that desired components are visible when rendered in the viewport.

In one embodiment, the steps of 220 and 240 are performed iteratively for a number of viewports, each viewport being of a corresponding size in respective iteration. The visibility report is then generated in the form of a two-dimensional matrix, with the different viewports along a first dimension (say, as columns of the matrix), and the components along a second dimension (say, as rows of the matrix). Each cell of the two-dimensional matrix at the intersection of a specific viewport and a specific component indicates whether the specific component is visible or non-visible when the responsive web page is rendered in the specific viewport.

By iteratively performing for different viewports, the user/developer is facilitated to identify potential non-visibility of (a same) component when a responsive web page is rendered by disparate devices. The user/developer may accordingly modify (as noted above) the responsive web page to ensure that the same component is visible in different viewports when the responsive web page is rendered by disparate devices.

Aspects of the present disclosure also facilitate a user/developer to determine the conformance of components with respect to desired requirements/standards when the responsive web page is rendered in different viewports. The manner in which testing tool 150 facilitates testing of conformance of viewports is described below with examples.

5. Testing Conformance of Components

Figure 2B:
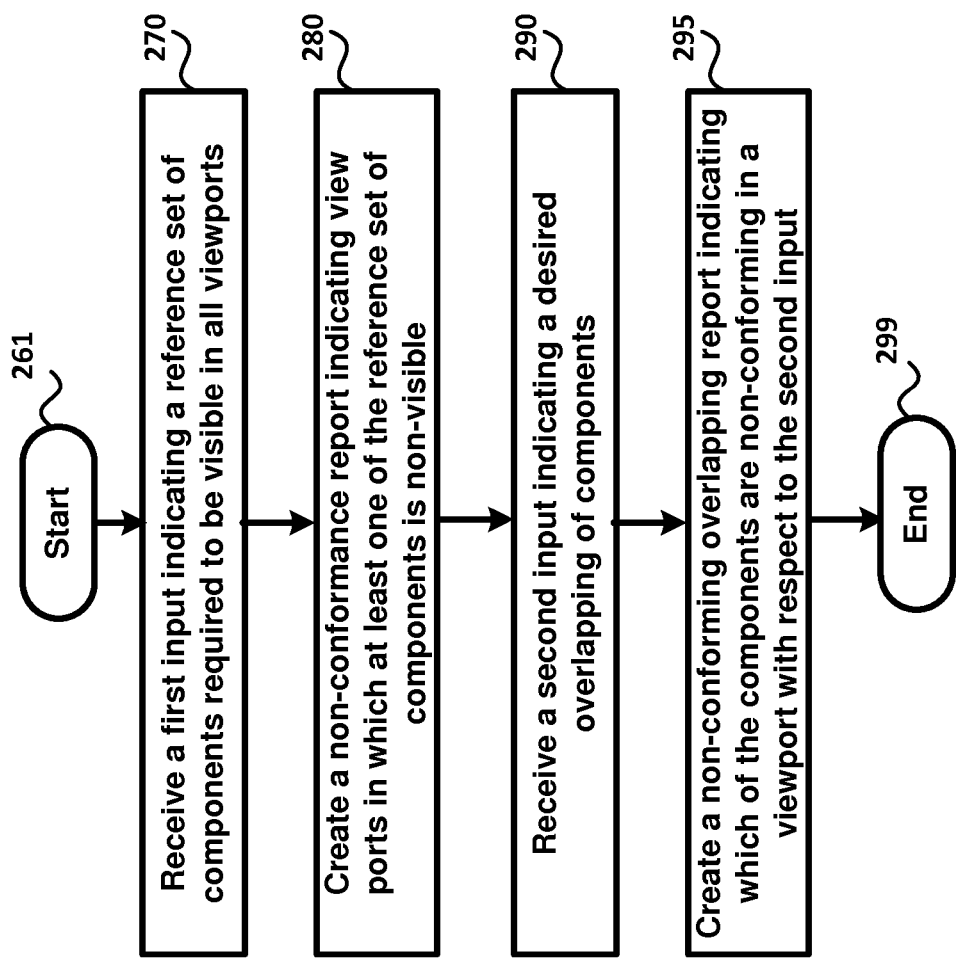
FIG. 2B is a flow chart illustrating the manner in which conformance of components of a responsive web page is tested according to an aspect of the present disclosure.

FIG. 2B is a flow chart illustrating the manner in which conformance of components of a responsive web page is tested according to an aspect of the present disclosure. The flowchart is described with respect to testing tool 150 of FIG. 1 merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 261, in which control immediately passes to step 270.

In step 270, testing tool 150 receives (from a user/developer) a first input indicating a reference set of components required to be visible in all viewports. In one embodiment, the first input is a reference viewport, with testing tool 150 then determining the components that are visible in the reference viewport as constituting the reference set of components.

In step 280, testing tool 150 creates a non-conformance report indicating the viewports (processed in steps 220 and 240) in which at least one of the reference set of components is non-visible. In other words, a viewport having one of reference components as non-visible does not conform to the requirement that all of the reference components be visible in the viewport. The approaches noted above with respect to FIG. 2A can be employed for initial determination of specific components that are visible and non-visible in each viewport.

In step 290, testing tool 150 receives a second input indicating a desired overlapping of components. In one embodiment, the second input is received in the form of a two-dimensional matrix with the same components being along both the dimensions. Each cell of the matrix indicates a corresponding overlap scenario (no overlap, exact overlap, partial overlap, etc.) between the pair of components specified by the two dimensions for that cell.

In step 295, testing tool 150 creates a non-conforming overlapping report indicating which one of the components are non-conforming in a viewport with respect to the second input. The overlapping report may be created based on examining the data structure noted in step 240. In particular, the non-conforming overlapping report indicates whether the overlap scenario between a pair of components in the first viewport is same as (or different from) the overlap scenario specified for the pair in the second input. The flow chart ends in step 299.

Thus, a user/developer is facilitated to test the conformance of various components of a responsive web page when rendered in multiple viewports (of different sizes). The manner in which testing tool 150 simplifies identification of potential non-visibility of components according to the flow chart of FIG. 2A is first described below with examples, followed by the manner in which testing tool 150 facilitates testing conformance of the components according to the flow chart of FIG. 2B.

6. Illustrative Example

FIGS. 3A-3E and 4 together illustrate the manner in which identification of potential non-visibility of user interface components when responsive web pages are rendered by disparate devices is simplified in one embodiment. Each of the Figures is described in detail below.

FIG. 3E depicts a portion of a responsive web page in one embodiment. The responsive web page is shown containing instructions according to HTML (hypertext markup language), as is well known in the relevant arts. Data portion 390 indicates that the web page has been coded to be responsive using the Bootstrap framework (available from Twitter, Inc., 1355 Market Street, Suite 900, San Francisco, Calif. 94103, United States). As is well known, the bootstrap framework provides a set of pre-defined CSS (cascading style sheets) and JavaScript libraries that facilitate a user to create responsive web pages.

As such, data portion 395 defined according to bootstrap framework, specifies a container having the unique identifier "P" (as indicated by the value of the attribute "id") having a row, which in turn has two columns "A1" and "A2". It may be appreciated that columns A1 and A2 represent UI components that are to be rendered, while container P represents a component for controlling the layout/placement of the UI components (here, A1 and A2). Similarly, other data portions specify various containers having other rows and columns/components of the responsive web page. It should be noted that only a sample set of component are shown in the Figure for illustration, and a responsive web page typically has a large number (100+) of UI component that are to be rendered.

Figure 3A:
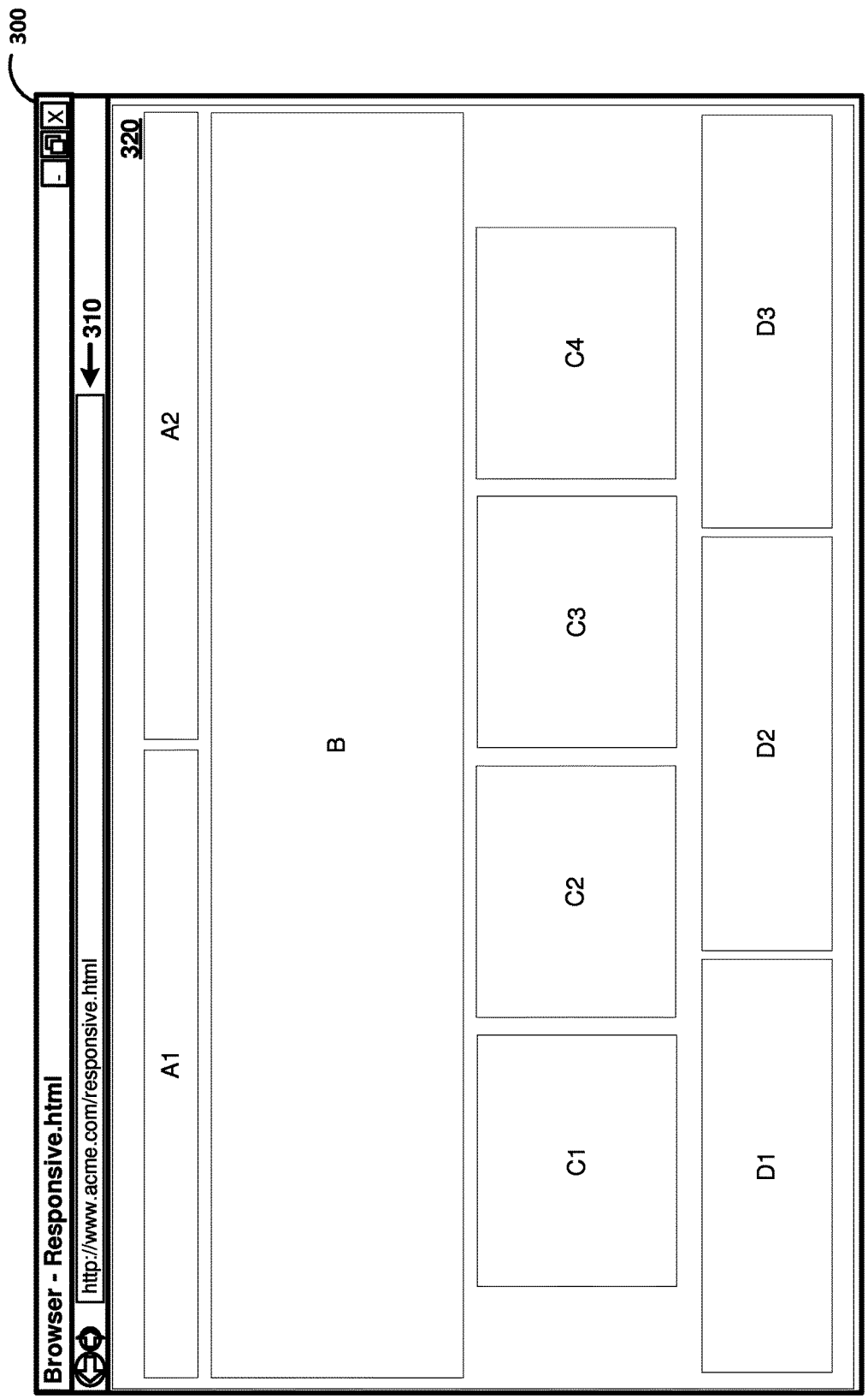
FIGS. 3A-3C depicts the manner in which a responsive web page is tested in multiple viewports of different sizes in one embodiment.
Figure 3B:
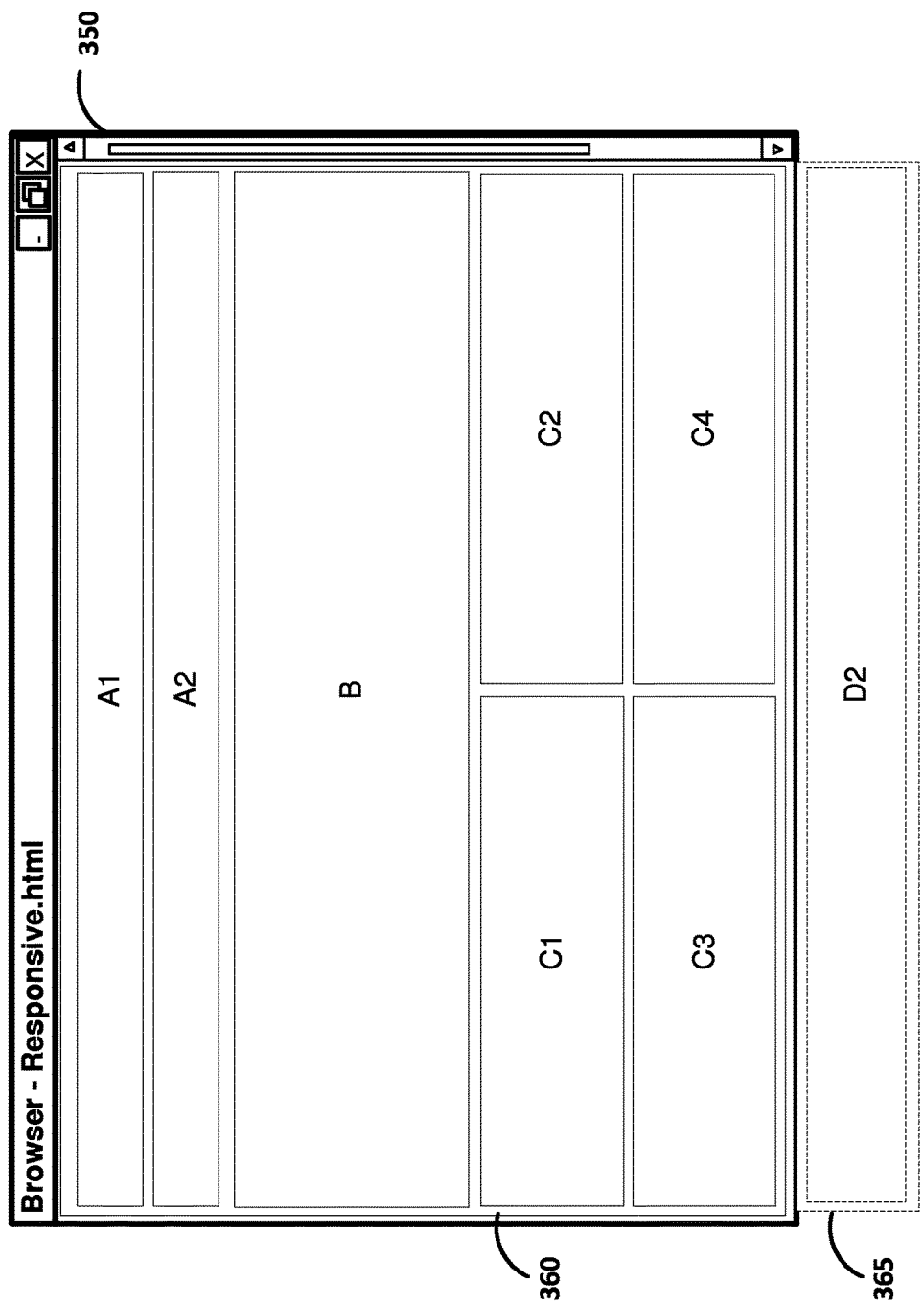
Figure 3D:
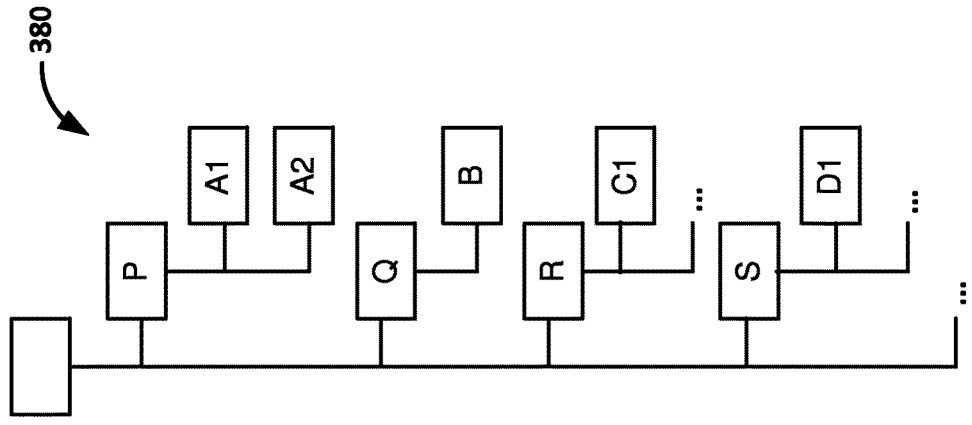
FIG. 3D depicts a portion of a document object model (DOM) generated by a browser in one embodiment.
Figure 3C:
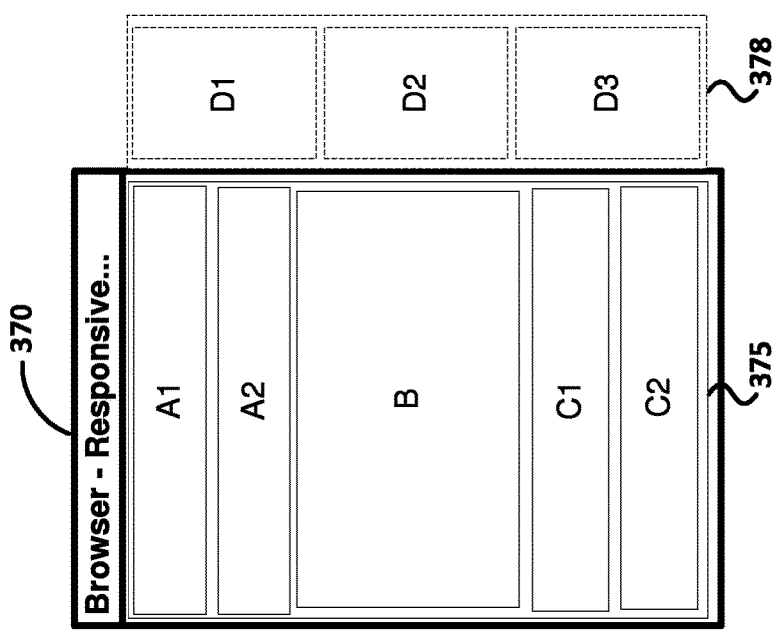

FIG. 3A-3C depicts the manner in which a responsive web page is tested in multiple viewports of different sizes in one embodiment. For illustration, the testing is shown to be performed for a sample set of viewports (corresponding to a desktop, a computing tablet and a mobile device) in which the responsive web page of FIG. 3E is rendered. However, the features of the present disclosure may be implemented in other environments having a larger number of viewports and/or different responsive web pages, as will be apparent to one skilled in the relevant arts by reading the disclosure provided herein.

Each of display area 300, 350 and 370 depicts a portion of a user interface rendered by a browser in response to receiving an instruction indicating the responsive web page (for example, that of FIG. 3E using the URL shown in display area 310) and a corresponding viewport of a different size from testing tool 150. The browser may render the portion of the user interface on a display unit (not shown) associated with server system 130.

It may be observed in FIG. 3A that display area 300 corresponds to the user interface of the browser, while display area 320 is the view port in which the responsive web page is rendered. It may be observed that the size (width by height) of viewport 320 is smaller than that of display area 300, due to various user interface elements (such as title bar, display area 310, etc.) provided by the browser. Similarly, in FIGS. 3B and 3C, display areas 350 and 370 corresponds to the respective portions of the user interface of the browser, while display areas 360 and 375 depicts the corresponding viewports (of different sizes).

Referring to FIG. 3A, display area/viewport 320 (corresponding to a desktop) is shown containing the UI components A1, A2, B, C1, C2, C3, C4, D1, D2 and D3 in accordance with the data portions of FIG. 3E. It may be observed that all the UI components specified in the responsive web page are visible when the page is rendered in viewport 320. In other words, in a scenario that the responsive webpage (of FIG. 3E) is rendered on an end user system (such as 160A-160X) in a viewport having a size equal to that of viewport 320, all the UI components specified in the responsive web page will be visible.

Referring to FIG. 3B, display area/viewport 360 (corresponding to a computing tablet) indicates that only some of the UI components specified in the responsive web page are visible in the viewport. For example, components D1, D2 and D3 are indicated to be non-visible in viewport 360. Display area 365 depicts a portion of the responsive web page which is rendered by the browser, when a user scrolls viewport 360 vertically (for example, using the vertical scroll bar shown in display area 350). As such, in response to the vertical scrolling, component D2 (currently shown in dotted lines) is rendered on the display unit and is accordingly made visible to the user. As noted above, components which are made visible after scrolling a viewport vertically are also deemed to be visible components.

Thus, only components D1 and D3 are non-visible components for a viewport of the size same as display area 360. In other words, FIG. 3B indicates that in a scenario that the responsive webpage (of FIG. 3E) is rendered by an end user system (such as 160A-160X) in a viewport having a size equal to that of viewport 360, the UI components D1 and D3 are non-visible.

Referring to FIG. 3C, display area/viewport 375 (corresponding to a mobile device) indicates that a lesser (as compared to viewport 350) number of UI components are visible in the viewport. For example, components C3, C4, D1, D2 and D3 are indicated to be non-visible in viewport 375. Display area 378 depicts a portion of the responsive web page which is rendered by the browser, when a user scrolls viewport 375 horizontally (for example, when a user swipes from right to left on the display unit/touch screen of the mobile device). As such, in response to the horizontal scrolling, components D1, D2 and D3 (currently shown in dotted lines) are rendered on the display unit and is accordingly made visible to the user. As noted above, components which are made visible after scrolling a viewport horizontally are deemed to be non-visible components. Thus, components C3, C4, D1, D2 and D3 are non-visible components for a viewport of the size same as display area 370.

7. Visibility Report

Testing tool 150, after the browser renders the responsive web page in each of the viewports (300, 350 and 370), examines a data structure generated by the browser to determine whether each of the components (specified in the responsive web page) are visible or non-visible. In one embodiment, testing tool 150 examines the document object model (DOM) generated by the browser. As is well known, a DOM provides a structured (a tree or hierarchy) representation of the UI components in a responsive web page that enables programs (external to the browser) to access and change the properties and behavior of the components.

FIG. 3D depicts a portion of a document object model (DOM) generated by a browser in one embodiment. In particular, hierarchy 380 corresponds to the DOM generated for the responsive web page of FIG. 3E. It may be observed that each of the UI components such as A1, B1, etc. and also layout components such as P, Q, R, etc. are represented as corresponding nodes in hierarchy 380. Nodes A1 and A2 are shown as children of Node P corresponding to the definition of A1 and A2 being contained within container P in data portion 395 of FIG. 3E. Similarly, the other nodes are organized in the hierarchy based on the definitions in the responsive web page (of FIG. 3E).

Testing tool 150 may perform the examination of the DOM in any convenient way, as suitable to the environment (browser type, version, programming languages supported, etc.) in which testing tool 150 is operative. In one embodiment, testing tool 150 invokes methods/constructs provided by the JQuery library to determine the specific components that are non-visible in the viewport, with the methods in turn being enabled to determine the non-visibility of each component based on inspection of the DOM. For example, testing tool 150 may retrieve the list of all the non-visible components (e.g. using the JQuery construct "$('element: hidden')") or check the visibility status of each component in the responsive web page (e.g. using the JQuery construct "$(element).is(":visible")").

More information on DOM is available in the document entitled "Document Object Model Level 2 Core Specification" by A. Le Hors, et al, Editors. World Wide Web Consortium, published on 13 Nov. 2000. A copy of the document is also available online at "http://www.w3.org/TR/2000/REC-DOM-Level-2-Core-20001113". More information on JQuery is available in the book entitled "Learning jQuery—Fourth Edition" by Jonathan Chaffer, Karl Swedberg (ISBN 139781782163145).

Alternatively, testing tool 150 may perform the determination of whether a specific component is visible or non-visible based on the values of the display attributes of the component and the viewport. For example, testing tool 150 may retrieve (from DOM) the values of x-coordinate, y-coordinate, width, height, and z-index (indicating the vertical stacking order) for each of the components and the viewport. Testing tool 150 may then form polygons (commonly, rectangles) representing the components and the viewport. The polygons/rectangles of the components and the viewport may be compared (for example, using geometrical techniques) to determine the components that are visible and non-visible in the viewport, as will be apparent to one skilled in the relevant arts by reading the disclosure herein.

Thus, after examining the DOM, testing tool 150 generates a report on which of the components are visible or non-visible in each viewport. FIG. 4 depicts portions of a visibility report generated for a responsive web page viewed in multiple viewports in one embodiment. The visibility report is shown in the form of a two-dimensional matrix (400), with the components of the responsive web page shown as rows (a first dimension), while the different viewports are shown as columns (a second dimension). Each cell of matrix 400 at the intersection of a specific viewport and a specific component indicates whether the specific component is visible (value "Yes") or non-visible (value "NO") when the responsive web page is rendered in the specific viewport.

Columns 410, 420 and 430 respectively corresponds to the viewports of FIGS. 3A, 3B and 3C, and accordingly the values of the cells reflect whether the corresponding components are visible or non-visible in the corresponding viewport. It may be observed that column 410 indicates that all the components are visible in viewport 320, while column 420 indicates that components D1 and D3 are non-visible in viewport 360, while column 430 indicates that components C3, C4, D1, D2 and D3 are non-visible in viewport 375. Similarly, a two dimensional matrix may be generated for a larger number of components/rows and more number of viewports/columns.

By inspecting the visibility report, a user/developer may manually check whether a desired set of components are visible in all the viewports. However, in many scenarios, for example, when the number of viewports is large (1000+), it may be desirable that the checking of whether a desired set of components are visible in all the viewports be performed in a automated (without manual intervention) manner.

According to an aspect of the present disclosure, a user/developer is facilitated to indicate a reference set of components that are required to be visible in all viewports, with the testing tool 150 then creating a non-conformance report indicating the specific viewports in which at least one reference component is not visible. The manner in which testing tool 150 creates such a non-conformance report is described below with examples.

8. Non-Conformance Report

In one embodiment, testing tool 150 receives (from a user/developer) a first input indicating a reference viewport, with the components that are visible in the reference viewport constituting a reference set of components (which are to be checked). The description is continued assuming that the reference viewport is viewport 360 (column 420 of matrix 400). The reference set of components contains the components that are required to be visible in all the viewports that are tested. Thus, testing tool 150 determines (in response to the user/developer indicating viewport 360) that the components A1, A2, B, C1, C2, C3, C4 and D2 are required to be present in all the viewports.

In response to receiving the first input, testing tool 150 examines (as noted above) the DOM corresponding to the other viewports (320 and 375) to determine whether each of the reference set of components is visible in the corresponding viewport. In an alternative embodiment, testing tool 150 may determine the visibility of the reference component by inspecting the visibility report (matrix 400). For example, testing tool 150 may compare the values in the column corresponding to the reference viewport with the columns corresponding to the other viewports being checked. In a scenario that there is a row where the column for the reference viewport has a "Yes" value, and the column for the another viewport has a "NO" value, the component corresponding to the row is indicated to be non-conforming (since the component is not visible in the another viewport contrary to the requirement that all reference components be visible in all viewports).

Testing tool 150 then creates a non-conformance report indicating the viewports in which at least one of the reference set of components is not visible. FIG. 5 depicts portions of a non-conformance report created with respect to a reference viewport in one embodiment. It may be observed that viewport 320 (column 410) is not included in the report since all the reference components are visible in viewport 320 (consistent with the requirement). Viewport 375 is shown in the non-conformance report since that viewport contains reference components (such as C3, C4 and D2) that are non-visible. It may be observed that for each of reference components included in the non-conformance report, there is a "Yes" value in column 420 (corresponding to viewport 360) and a "NO" value in column 430 (corresponding to viewport 375). Components D1 and D3 are not shown as part of the report, since they are non-visible in the reference viewport (column 420) and are accordingly not included in the reference set of components.

Thus, testing tool 150 creates a non-conformance report indicating which of a set of viewports are non-compliant with the requirement of a set of reference components to be visible in all the viewports.

It may be also desirable that the manner in which different components of a responsive web page overlap with each other be consistent across multiple viewports. For example, it may be desirable that two components never overlap in all viewports. Accordingly, it may be required that the overlapping of the components be checked when a web page is rendered in multiple view ports.

According to an aspect of the present disclosure, a user/developer is facilitated to indicate the desired overlapping among the various components (of interest) of a responsive web page, with the testing tool 150 then creating a non-conforming overlapping report indicating the components of interest that are non-conforming with the desired overlapping in a specific viewport. The manner in which testing tool 150 creates such a non-conforming overlapping report is described below with examples.

9. Non-Conforming Overlapping Report

In one embodiment, the overlapping of the components is identified by corresponding pre-defined overlapping scenarios. A sample set of overlapping scenarios that may be used to indicate the overlapping of components is described below with example. However, in alternative embodiments, any desired set of overlapping scenarios as suitable for the environment may be used.

FIG. 6A illustrates various overlapping scenarios among two UI components of a responsive web page in one embodiment. For convenience, the two UI components are labeled X and Y and are represented by a solid rectangle and a dotted rectangle respectively. As may be readily observed, the state of overlap between any two components (such as X and Y) in a responsive web page can be represented by four distinct scenarios:

(a) Scenario 1 (S1) where component X has no overlap with component Y as shown in 611;
(b) Scenario 2 (S2) where one of the components (assumed to be X) is bigger than the other component (Y) such that the bigger component X completely overlaps (and accordingly completely hides) component Y or component Y is visible on top of (and hence partially hides) component X as shown in 612;
(c) Scenario 3 (S3) where component X partially overlaps component Y as shown in 613; and
(d) Scenario 4 (S4) where components X and Y are equal in size (width and height) such that component X overlaps with (and completely hides) component Y as shown in 614 (though for understanding, both the components are shown in 614).

Figure 6B:
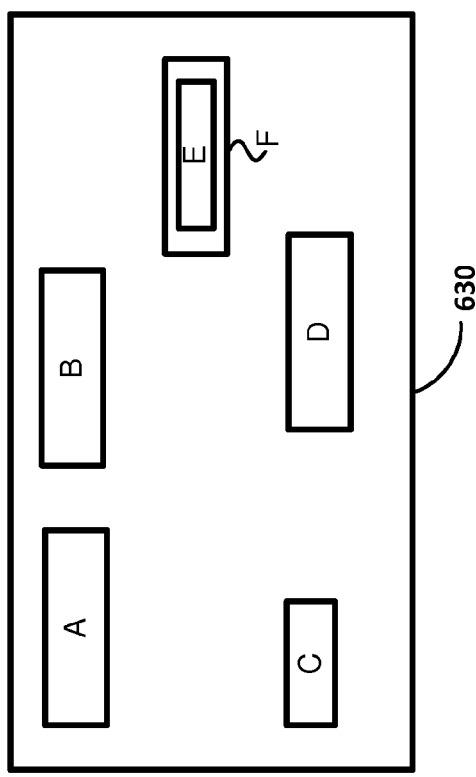
FIG. 6B illustrates the manner in which an input indicating the desired overlapping scenarios is provided in one embodiment.

Testing tool 150 receives (from a user/developer) a second input (from a user/developer) indicating the desired overlapping scenarios (S1, S2, S3 or S4) among the various components of a responsive web page. FIG. 6B illustrates the manner in which an input indicating the desired overlapping scenarios is provided in one embodiment. Display area 630 depicts the various UI components (A to F) of the responsive web page and the manner in which they overlap. It may be observed that the component E is shown visible on top of (accordingly partially hiding) component F. It should be noted that only a set of components of interest of the response web page are shown in display area 630 for illustration, and in alternative embodiments, the set may include all of the components of the web page.

In one embodiment, the second input is in the form of a two-dimensional matrix (640), with the components of interest along both of a first dimension (rows) and a second dimension (columns) of the two-dimensional matrix. Matrix 640 is accordingly a square matrix having the components of interests as both rows and columns Each cell of the two-dimensional matrix 640 at the intersection of a first component (e.g. A) along the first dimension and a second component along the second dimension (e.g. D) indicates an overlap scenario (S1) between the first component and the second component. The overlap scenario may be one of the four scenarios (noted above) according to which the corresponding components overlap in the responsive web page. It may be observed that the matrix is symmetrical about the diagonal, with the same overlap scenario being indicated for both the combinations of (row A, column D) and (row D, column A). However, in alternative embodiments, different overlap scenarios may be specified for the two combinations (thereby making matrix 640 as non-symmetrical) based on the scenarios chosen as the pre-defined set.

In response to receiving the second input, testing tool 150 examines the DOM corresponding to the web page for a viewport to determine whether the components of interest have corresponding overlapping scenario as specified by the second input. Some of the techniques noted above, such as the polygon based comparison, may be used to determine the overlapping scenarios between the components in the viewport. Testing tool 150 then compares the determined overlapping scenario between a pair of components with the scenario specified for the pair in the second input and accordingly generates a non-confirming overlapping report indicating the non-conforming components.

Figure 6C:
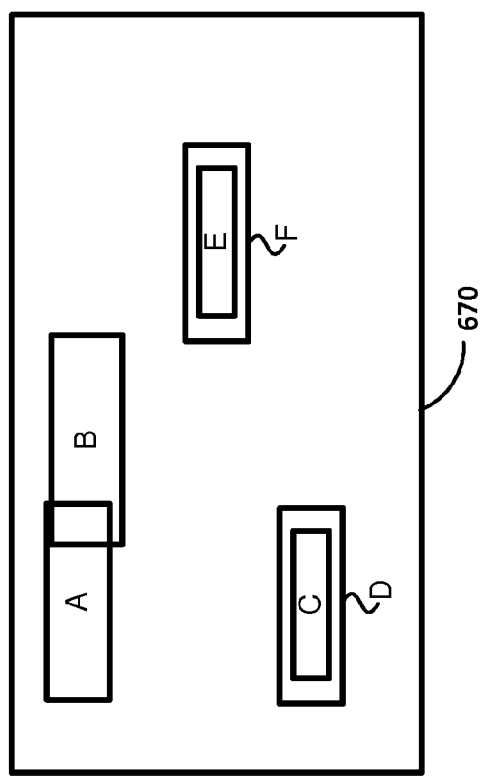
FIG. 6C illustrates the manner in which a non-conforming overlapping report for components of interest of a response web page is created in one embodiment.

FIG. 6C illustrates the manner in which a non-conforming overlapping report for components of interest of a response web page is created in one embodiment. Display area 670 represents the manner in which components A through F are rendered by a browser in one viewport (for example, viewport 360) being tested. It may be observed that components A and B have a partial overlap, while component C is visible on top of component D, both of which is non-conforming with the overlapping scenario specified in the second input (matrix 640).

Testing tool 150 accordingly create a non-conforming overlapping report that also indicates which ones of the components of interest are non-conforming in a viewport with respect to the second input. In one embodiment, testing tool 150 generates matrix 680 similar to the second input/matrix 640, with the components of interest as the rows and columns and each cell indicating the actual/rendered overlap scenario between pairs of components in the viewport being tested. Testing tool 150 also compares matrix 680 with the input matrix 640 and highlights the cells where the overlapping scenario in the viewport is different from (and is accordingly non-conforming with) the corresponding overlapping scenario specified in the input matrix 640. The differing cells are shown cross hatched in matrix 680, thereby indicating to the user/developer the specific non-confirming overlapping scenarios in the viewport being tested.

Thus, testing tool 150 creates a non-conforming overlapping report indicating the components of interest that are non-conforming with the desired overlapping in a specific viewport. It may be appreciated that the non-conformance and non-conforming overlapping report facilitate users/developers to further check the potential non-visibility of user interface components when responsive web pages are rendered by disparate devices.

It should be appreciated that the features described above can be implemented in various embodiments as a desired combination of one or more of hardware, executable modules, and firmware. The description is continued with respect to an embodiment in which various features are operative when executable modules are executed.

10. Digital Processing System

Figure 7:
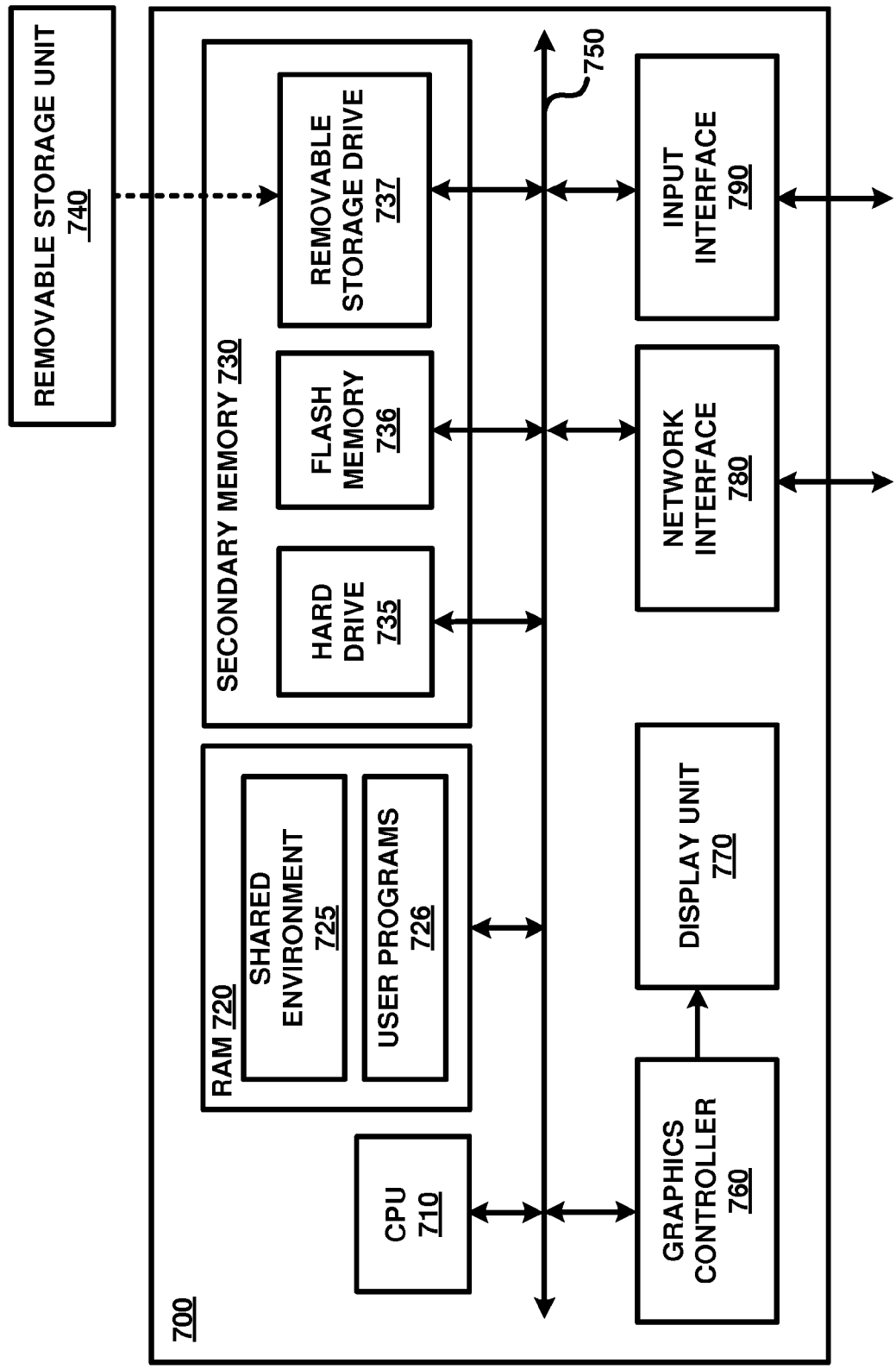
FIG. 7 is a block diagram illustrating the details of a digital processing system in which various aspects of the present disclosure are operative by execution of appropriate executable modules.

FIG. 7 is a block diagram illustrating the details of digital processing system 700 in which various aspects of the present disclosure are operative by execution of appropriate executable modules. Digital processing system 700 may correspond to any system (such as server system 130) executing testing tool 150 or end user systems 160A-160X.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and user programs 726. Shared environment 725 includes operating systems, device drivers, virtual machines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images defined by the display signals. Each of the displays shown in FIGS. 3A-3C and 6A-6C corresponds to an image screen displayed at corresponding time duration on the display screen. Input interface 790 may correspond to a keyboard and a pointing device (e.g., touch-pad, mouse) and may be used to provide inputs (such as the reference set of components, reference viewport, desired overlapping matrix, etc. as provided by users/developers). Network interface 780 provides connectivity to a network (e.g., using Internet Protocol), and may be used to communicate with other systems (of FIG. 1) connected to the network (110).

Secondary memory 730 may contain hard drive 735, flash memory 736, and removable storage drive 737. Secondary memory 730 may store the data (for example, portions of the data shown in FIGS. 3D, 4, 5, 6B and 6C, etc.) and software instructions (for implementing the flowchart of FIGS. 2A and 2B), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of testing responsive web pages, said method comprising:
    instructing a browser to display a responsive web page in a first viewport of a first size, wherein said browser in response renders said responsive web page in said first viewport of said first size, said responsive web page containing a plurality of components;
    examining a data structure generated by said browser to determine whether each of said plurality of components is visible or non-visible within said first viewport when said browser renders said responsive web page in said first viewport;
    iteratively performing said instructing and said examining for rendering said responsive web page in a plurality of viewports including said first viewport, each viewport being of a corresponding size in respective iteration; and
    generating a visibility report indicating whether each of said plurality of components is visible or non-visible in said plurality of view ports including said first viewport,
    wherein said visibility report is in the form of a two-dimensional matrix, with said plurality of viewports along a first dimension, and the plurality of components along a second dimension,
    wherein each cell of said two-dimensional matrix at the intersection of a specific viewport and a specific component indicates whether said specific component is visible or non-visible when said responsive web page is rendered in said specific viewport.

2. The method of claim 1, further comprising:
    receiving a first input indicating a reference set of components of said plurality of components, wherein each of said reference set of components is required to be visible in all of said plurality of viewports,
    wherein said generating further creates a non-conformance report indicating that a first set of viewports of said plurality of viewports are non-conforming, wherein a viewport is included in said first set of viewports if at least one of said reference set of components is non-visible in said viewport.

3. The method of claim 2, wherein said first input comprises a reference viewport of said plurality of viewports, said method further comprising determining, in response to receiving said first input, that the components that are visible in said reference viewport constitute said reference set of components.

4. A method of testing responsive web pages, said method comprising:
    instructing a browser to display a responsive web page in a first viewport of a first size, wherein said browser in response renders said responsive web page in said first viewport of said first size, said responsive web page containing a plurality of components;
    examining a data structure generated by said browser to determine whether each of said plurality of components is visible or non-visible within said first viewport when said browser renders said responsive web page in said first viewport;
    generating a visibility report indicating whether each of said plurality of components is visible or non-visible in said first viewport;
    receiving a second input indicating a desired overlapping of each component of said plurality of components with other components of said plurality of components; and
    creating a non-conforming overlapping report indicating which one of said plurality of components are non-conforming in said first viewport with respect to said second input.

5. The method of claim 4, wherein said second input is in the form of a first two-dimensional matrix, with said plurality of components along both of a first dimension and a second dimension of said first two-dimensional matrix,
    wherein each cell of said first two-dimensional matrix at the intersection of a first component along said first dimension and a second component along said second dimension indicates a overlap scenario between said first component and said second component,
    wherein said non-conforming overlapping report is created in the form of a second two-dimensional matrix similar to said first two-dimensional matrix, said second two-dimensional matrix indicating whether the overlap scenario between said first component and said second component in said first viewport is same as the overlap scenario specified in said second input.

6. The method of claim 5, wherein said overlap scenario is one of:

(a) said first component has no overlap with said second component,
(b) said first component is bigger than said second component such that said first component completely overlaps said second component or said second component is visible on top of said first component,
(c) said first component partially overlaps with said second component, and
(d) said first component is equal in size to said second component such that said first component completely overlaps said second component.

7. A non-transitory machine readable medium storing one or more sequences of instructions for enabling a system to test responsive web pages, wherein execution of said one or more instructions by one or more processors contained in said system enables said system to perform the actions of:
instructing a browser to display a responsive web page in a first viewport of a first size, wherein said browser in response renders said responsive web page in said first viewport of said first size, said responsive web page containing a plurality of components;
examining a data structure generated by said browser to determine whether each of said plurality of components is visible or non-visible within said first viewport when said browser renders said responsive web page in said first viewport;
iteratively performing said instructing and said examining for rendering said responsive web page in a plurality of viewports including said first viewport, each viewport being of a corresponding size in respective iteration; and
generating a visibility report indicating whether each of said plurality of components is visible or non-visible in said plurality of view ports including said first viewport,
wherein said visibility report is in the form of a two-dimensional matrix, with said plurality of viewports along a first dimension, and the plurality of components along a second dimension,
wherein each cell of said two-dimensional matrix at the intersection of a specific viewport and a specific component indicates whether said specific component is visible or non-visible when said responsive web page is rendered in said specific viewport.

8. The machine readable medium of claim 7, further comprising one or more instructions for:
receiving a first input indicating a reference set of components of said plurality of components, wherein each of said reference set of components is required to be visible in all of said plurality of viewports,
wherein said generating further creates a non-conformance report indicating that a first set of viewports of said plurality of viewports are non-conforming, wherein a viewport is included in said first set of viewports if at least one of said reference set of components is non-visible in said viewport.

9. The machine readable medium of claim 8, wherein said first input comprises a reference viewport of said plurality of viewports, further comprising one or more instructions for determining, in response to receiving said first input, that the components that are visible in said reference viewport constitute said reference set of components.

10. A non-transitory machine readable medium storing one or more sequences of instructions for enabling a system to test responsive web pages, wherein execution of said one or more instructions by one or more processors contained in said system enables said system to perform the actions of:
instructing a browser to display a responsive web page in a first viewport of a first size, wherein said browser in response renders said responsive web page in said first viewport of said first size, said responsive web page containing a plurality of components;
examining a data structure generated by said browser to determine whether each of said plurality of components is visible or non-visible within said first viewport when said browser renders said responsive web page in said first viewport;
generating a visibility report indicating whether each of said plurality of components is visible or non-visible in said first viewport;
receiving a second input indicating a desired overlapping of each component of said plurality of components with other components of said plurality of components; and
creating a non-conforming overlapping report indicating which one of said plurality of components are non-conforming in said first viewport with respect to said second input.

11. The machine readable medium of claim 10, wherein said second input is in the form of a first two-dimensional matrix, with said plurality of components along both of a first dimension and a second dimension of said first two-dimensional matrix,
wherein each cell of said first two-dimensional matrix at the intersection of a first component along said first dimension and a second component along said second dimension indicates a overlap scenario between said first component and said second component,
wherein said non-conforming overlapping report is created in the form of a second two-dimensional matrix similar to said first two-dimensional matrix, said second two-dimensional matrix indicating whether the overlap scenario between said first component and said second component in said first viewport is same as the overlap scenario specified in said second input.

12. The machine readable medium of claim 11, wherein said overlap scenario is one of:
(a) said first component has no overlap with said second component,
(b) said first component is bigger than said second component such that said first component completely overlaps said second component or said second component is visible on top of said first component,
(c) said first component partially overlaps with said second component, and
(d) said first component is equal in size to said second component such that said first component completely overlaps said second component.

13. A digital processing system comprising:
a processor;
a random access memory (RAM);
a machine readable medium to store one or more instructions, which when retrieved into said RAM and executed by said processor causes said digital processing system to test responsive web pages, said digital processing system performing the actions of:
instructing a browser to display a responsive web page in a first viewport of a first size, wherein said browser in response renders said responsive web page in said first viewport of said first size, said responsive web page containing a plurality of components;
examining a data structure generated by said browser to determine whether each of said plurality of components is visible or non-visible within said first viewport when said browser renders said responsive web page in said first viewport;

iteratively performing said instructing and said examining for rendering said responsive web page in a plurality of viewports including said first viewport, each viewport being of a corresponding size in respective iteration; and generating a visibility report indicating whether each of said plurality of components is visible or non-visible in said first viewport, wherein said visibility report is in the form of a two-dimensional matrix, with said plurality of viewports along a first dimension, and the plurality of components along a second dimension, wherein each cell of said two-dimensional matrix at the intersection of a specific viewport and a specific component indicates whether said specific component is visible or non-visible when said responsive web page is rendered in said specific viewport.

14. The digital processing system of claim 13, further performing the actions of:

receiving a first input indicating a reference set of components of said plurality of components, wherein each of said reference set of components is required to be visible in all of said plurality of viewports, wherein said digital processing system further creates a non-conformance report indicating that a first set of viewports of said plurality of viewports are non-conforming, wherein a viewport is included in said first set of viewports if at least one of said reference set of components is non-visible in said viewport.

15. The digital processing system of claim 14, wherein said first input comprises a reference viewport of said plurality of viewports, said digital processing system further determines, in response to receiving said first input, that the components that are visible in said reference viewport constitute said reference set of components.

16. A digital processing system comprising:

a processor;

a random access memory (RAM);

a machine readable medium to store one or more instructions, which when retrieved into said RAM and executed by said processor causes said digital processing system to test responsive web pages, said digital processing system performing the actions of:

instructing a browser to display a responsive web page in a first viewport of a first size, wherein said browser in response renders said responsive web page in said first viewport of said first size, said responsive web page containing a plurality of components;

examining a data structure generated by said browser to determine whether each of said plurality of components is visible or non-visible within said first viewport when said browser renders said responsive web page in said first viewport;

generating a visibility report indicating whether each of said plurality of components is visible or non-visible in said first viewport;

receiving a second input indicating a desired overlapping of each component of said plurality of components with other components of said plurality of components; and creating a non-conforming overlapping report indicating which one of said plurality of components are non-conforming in said first viewport with respect to said second input.

17. The digital processing system of claim 16, wherein said second input is in the form of a first two-dimensional matrix, with said plurality of components along both of a first dimension and a second dimension of said first two-dimensional matrix, wherein each cell of said first two-dimensional matrix at the intersection of a first component along said first dimension and a second component along said second dimension indicates a overlap scenario between said first component and said second component, wherein said non-conforming overlapping report is created in the form of a second two-dimensional matrix similar to said first two-dimensional matrix, said second two-dimensional matrix indicating whether the overlap scenario between said first component and said second component in said first viewport is same as the overlap scenario specified in said second input.

18. The digital processing system of claim 16, wherein said overlap scenario is one of:

(a) said first component has no overlap with said second component, (b) said first component is bigger than said second component such that said first component completely overlaps said second component or said second component is visible on top of said first component, (c) said first component partially overlaps with said second component, and (d) said first component is equal in size to said second component such that said first component completely overlaps said second component.

* * * * *